United States Patent
Ito

(10) Patent No.: US 11,526,250 B2
(45) Date of Patent: Dec. 13, 2022

(54) INFORMATION PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Hironao Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 16/887,870

(22) Filed: May 29, 2020

(65) Prior Publication Data

US 2020/0387288 A1 Dec. 10, 2020

(30) Foreign Application Priority Data

Jun. 7, 2019 (JP) .............................. JP2019-107089

(51) Int. Cl.
*G06F 3/04815* (2022.01)
*G06T 15/20* (2011.01)
(Continued)

(52) U.S. Cl.
CPC .......... *G06F 3/04815* (2013.01); *G06T 15/20* (2013.01); *G06V 20/10* (2022.01);
(Continued)

(58) Field of Classification Search
CPC .. G06F 3/04815; H04N 13/111; H04N 13/00; H04N 21/431; H04N 13/243; H04N 13/117; H04N 21/21805; H04N 21/4312; H04N 21/6587; H04N 21/4728; G06K 9/00664; G06T 15/20; G06T 2200/24; G06V 20/10; G06V 10/16; G06V 20/42; G06V 20/64

See application file for complete search history.

(56) References Cited

U.S. PATENT DOCUMENTS

2010/0171834 A1* 7/2010 Blumenfeld ........... H04N 7/185
348/E7.086
2014/0075476 A1* 3/2014 de Paz ............. H04N 21/25808
725/37

(Continued)

FOREIGN PATENT DOCUMENTS

JP 2013183233 A 9/2013
JP 6429829 B2 11/2018

*Primary Examiner* — Michael E Teitelbaum
(74) *Attorney, Agent, or Firm* — Canon U.S.A., Inc. IP Division

(57) ABSTRACT

The present invention provides a user with a user interface for enabling the user to efficiently perform an operation for generating a virtual viewpoint image for each imaging target subject to be imaged by a plurality of imaging apparatuses. An event information acquisition unit acquires information about an event subjected to virtual viewpoint image generation, and transmits the acquired event information to a user interface (UI) determination unit. The UI determination unit determines a UI to be generated by a UI generation unit based on the event information transmitted from the event information acquisition unit. The UI generation unit generates the UI determined by the UI determination unit. The user performs an input operation for generating a virtual viewpoint image according to the UI generated by the UI generation unit.

16 Claims, 8 Drawing Sheets

(51) Int. Cl.
*H04N 21/431* (2011.01)
*H04N 13/111* (2018.01)
*H04N 13/00* (2018.01)
*G06V 20/10* (2022.01)

(52) U.S. Cl.
CPC ........... H04N 13/00 (2013.01); H04N 13/111 (2018.05); H04N 21/431 (2013.01)

(56) References Cited

U.S. PATENT DOCUMENTS

2016/0127692 A1* 5/2016 Yoneji ................ G06K 9/00664
348/159
2017/0085803 A1* 3/2017 Chin ..................... G06F 3/0482

* cited by examiner

INFORMATION PROCESSING APPARATUS, METHOD FOR CONTROLLING THE SAME, AND STORAGE MEDIUM

BACKGROUND

Field

The present disclosure relates to techniques for generating a virtual viewpoint image.

Description of the Related Art

Techniques noticed in recent years include a technique for capturing images from a plurality of directions in synchronization with a plurality of imaging apparatuses installed at different positions, and generating a virtual viewpoint image viewed from an arbitrary viewpoint (virtual viewpoint) by using a plurality of viewpoint images captured by the imaging apparatuses. The above-described technique for generating a virtual viewpoint image makes it possible to generate images for viewing various events such as sport games, concerts, and dramas from arbitrary viewpoints.

Japanese Patent No. 06429829 discusses an image generation apparatus for generating a virtual viewpoint image based on captured images captured by a plurality of imaging apparatuses, and foreground texture image, background texture image, and three-dimensional model data generated based on the captured images.

The image generation apparatus discussed in Japanese Patent No. 06429829 enables the user to generate a virtual viewpoint image by performing an operation for specifying a virtual viewpoint. In an example case where a soccer game is subjected to image capturing by using a plurality of imaging apparatuses, it is assumed that the user wants to generate a virtual viewpoint image for viewing a goal scene from a viewpoint around the goal. In another example case where a karate is subjected to image capturing by using a plurality of imaging apparatuses, it is assumed that the user wants to generate a virtual viewpoint image for viewing players from the lateral side thereof. Since the user wants to view a scene from a different viewpoint for each imaging target subject as described above, the virtual viewpoint image to be generated is assumed to be different for each imaging target subject. However, the image generation apparatus discussed in Japanese Patent No. 06429829 is not assumed to provide the user with a different user interface for generating a virtual viewpoint image for each imaging target subject. Therefore, even if the image generation apparatus discussed in Japanese Patent No. 06429829 is used, the user may possibly be unable to efficiently perform an operation for generating a desired virtual viewpoint image.

SUMMARY

The present disclosure is directed to providing the user with a user interface for enabling the user to efficiently perform an operation for generating a virtual viewpoint image for each imaging target subject to be captured by a plurality of imaging apparatuses.

According to an aspect of the present disclosure, an information processing apparatus includes a determination unit configured to determine a user interface to be provided for a user from among a plurality of different user interfaces used for generating a virtual viewpoint image based on a plurality of captured images of an imaging target subject captured by a plurality of imaging apparatuses and used for generating virtual viewpoint images of different imaging target subjects; and a provision unit configured to provide the user with the user interface determined by the determination unit.

Further features of the present disclosure will become apparent from the following description of exemplary embodiments with reference to the attached drawings.

DESCRIPTION OF THE EMBODIMENTS

Examples of exemplary embodiments will be described below with reference to the accompanying drawings. The components according to the following exemplary embodiments indicate examples of exemplary embodiments of the present disclosure, and do not limit the scope of the present disclosure thereto.

Figure 8:
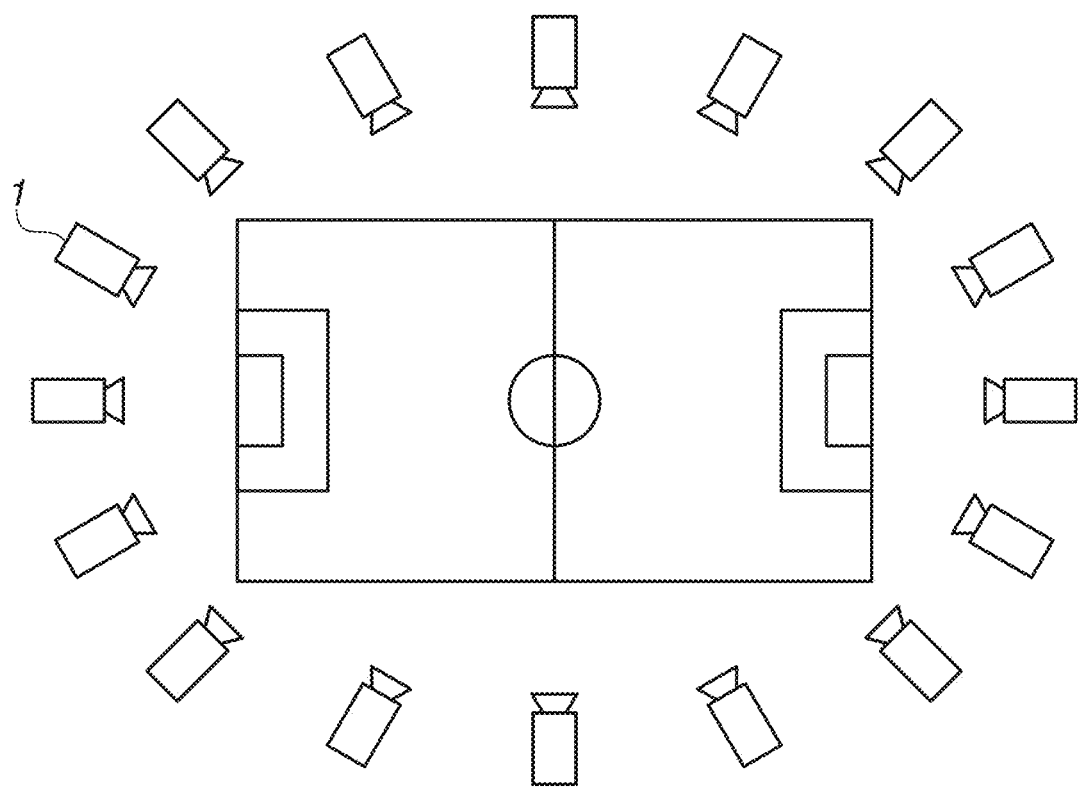
FIG. 8 illustrates an example of an arrangement of a plurality of imaging apparatuses.

A first exemplary embodiment will be described below centering on an information processing apparatus for generating different operation screens for generating virtual viewpoint images related to different imaging target subjects as user interfaces (UIs) for generating virtual viewpoint images and providing a user with the operation screens. The present exemplary embodiment will be described below centering on an example case where the imaging target subject is an event. Firstly, virtual viewpoint images generated by the information processing apparatus will be described below. A virtual viewpoint image refers to an image representing the view from a specified virtual viewpoint based on a plurality of images captured by a plurality of imaging apparatuses, and a specified arbitrary viewpoint (virtual viewpoint). The plurality of imaging apparatuses may be arranged to surround the imaging region like imaging apparatuses 1 illustrated in FIG. 8, the arrangement and the number of imaging apparatuses are not limited thereto. A virtual viewpoint image according to the present exemplary embodiment is also referred to as a free viewpoint image, and is not limited to the image corresponding to the viewpoint freely (arbitrarily) specified by user. For example, a virtual viewpoint image also includes the image corresponding to the viewpoint selected from a plurality of candidates by the user. A virtual viewpoint image according to the present exemplary embodiment includes a still image and a moving image. Also, according to the present exemplary embodiment, data for generating a virtual viewpoint image is referred to as material data. The material data includes captured images captured by imaging apparatuses and data generated based on the captured images. The material data is stored in an auxiliary storage device (described below) and used when generating a virtual viewpoint image. Types of material data and a method for generating material data will be described in detail below.

Figure 1:
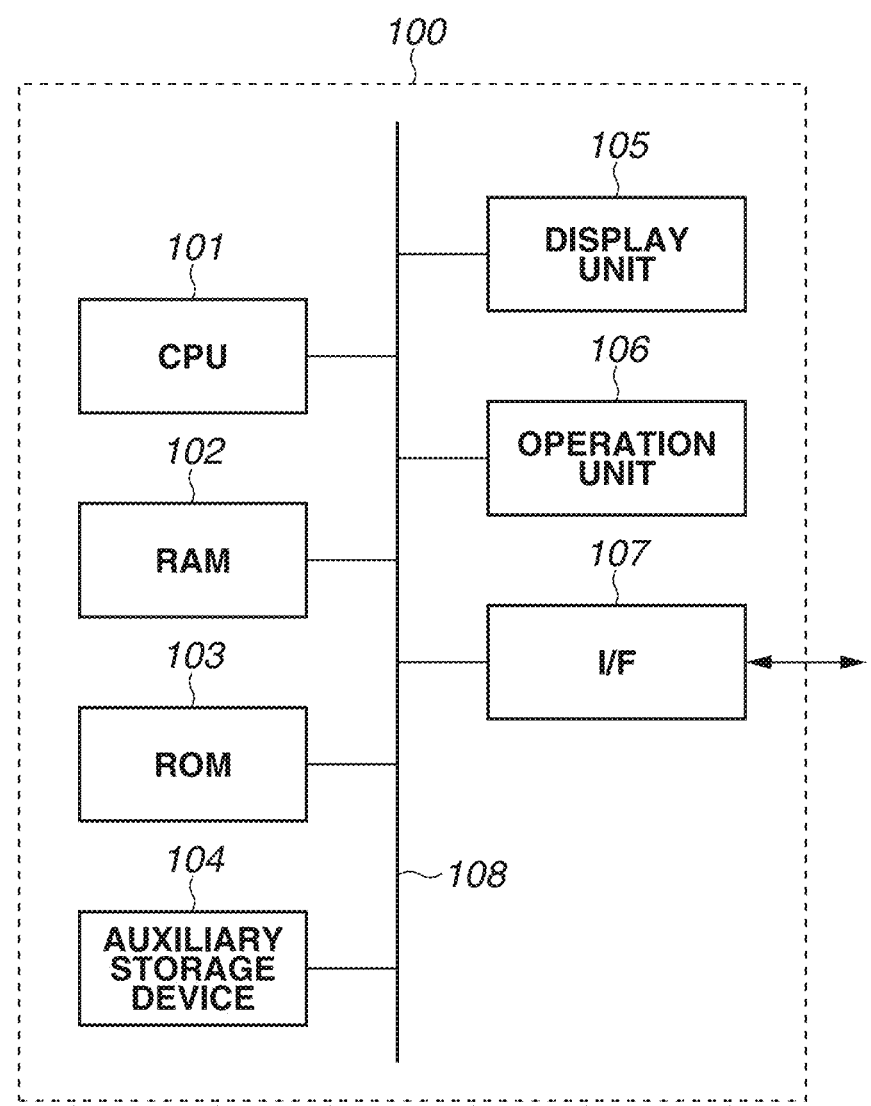
FIG. 1 illustrates a hardware configuration of an information processing apparatus.

A hardware configuration of an information processing apparatus 100 according to the present exemplary embodiment will be described below with reference to FIG. 1. A central processing unit (CPU) 101 controls the entire information processing apparatus 100 by using a computer program and data stored in a read only memory (ROM) 102 and a random access memory (RAM) 103, to implement each function of the information processing apparatus 100 illustrated in FIG. 1. The information processing apparatus 100 may include one or a plurality of dedicated hardware components different from the CPU 101, and the dedicated hardware component may execute at least part of processing by the CPU 101. Examples of dedicated hardware components include an Application Specific Integrated Circuit (ASIC), a Field Programmable Gate Array (FPGA), and a Digital Signal Processor (DSP). The ROM 102 stores programs which does not need to be changed. The RAM 103 temporarily stores programs and data supplied from an auxiliary storage device 104 and data supplied from the outside via a communication interface (I/F) 107. For example, the auxiliary storage device 104 includes a hard disk drive and stores various types of data such as image data and audio data.

A display unit 105 includes, for example, a liquid crystal display or LEDs, and displays graphical user interfaces (GUIs) for enabling the user to operate the information processing apparatus 100. The operation unit 106 includes, for example, a keyboard, a mouse, a controller (e.g., a joystick), a touch panel, and a microphone. Upon reception of user operations, the operation unit 106 inputs various instructions to the CPU 101. The CPU 101 operates as a display control unit for controlling the display unit 105, and an operation control unit for controlling the operation unit 106.

A communication I/F 107 is used to communicate with an apparatus outside the information processing apparatus 100. For example, when the information processing apparatus 100 is by wire connected with an external apparatus, a communication cable is connected to the communication I/F 107. When the information processing apparatus 100 has a function of wirelessly communicating with an external apparatus, the communication I/F 107 is provided with an antenna. A bus 108 connects the units of the information processing apparatus 100 and transmits information.

Although, in the present exemplary embodiment, the information processing apparatus 100 includes the auxiliary storage device 104, the display unit 105, and the operation unit 106, the present disclosure is not limited thereto. The information processing apparatus 100 may be configured in such a way that at least any one of the auxiliary storage device 104, the display unit 105, and the operation unit 106 is connected, as different apparatuses, to the outside of the information processing apparatus 100.

Figure 2:
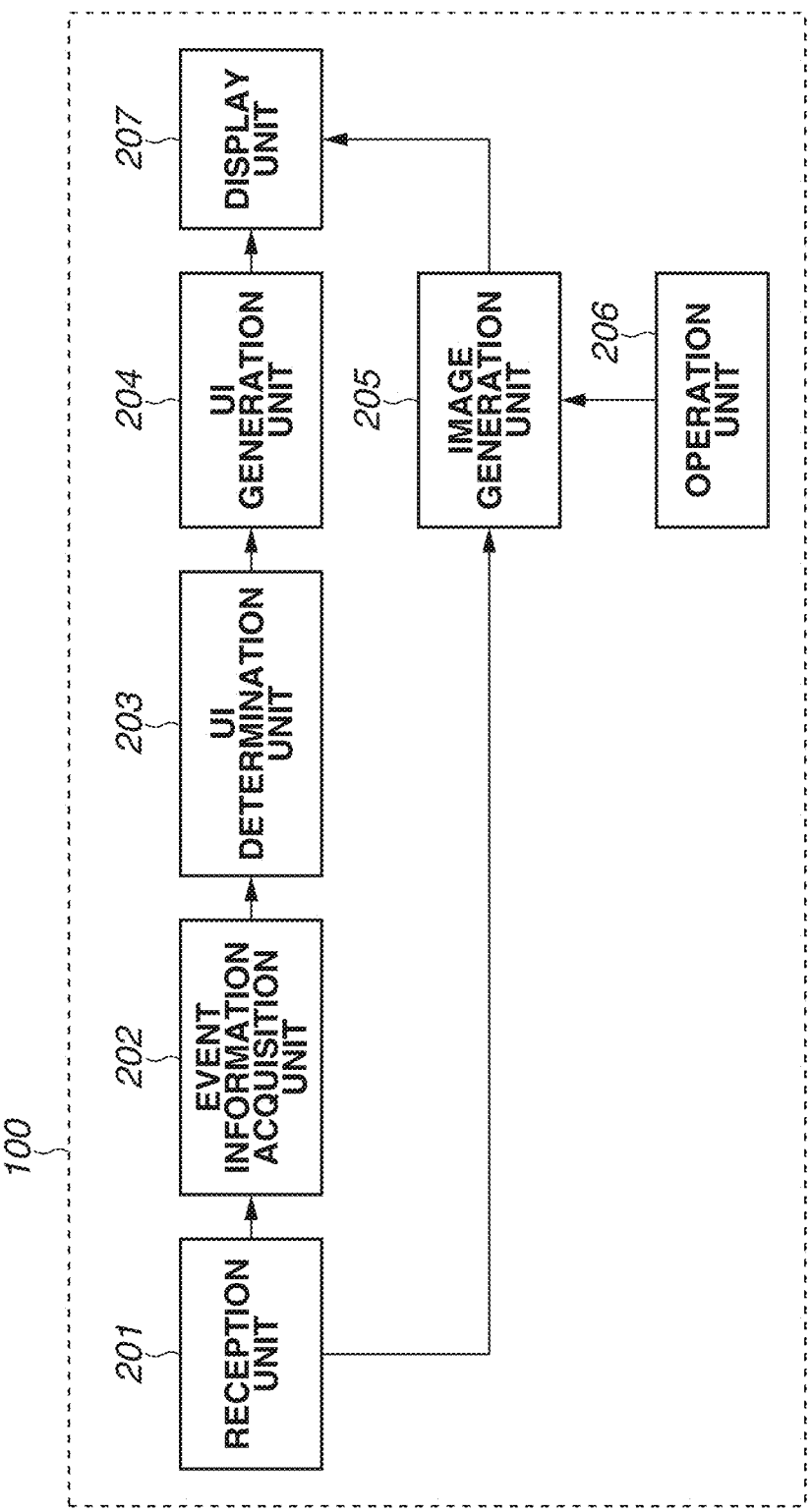
FIG. 2 illustrates a function configuration of the information processing apparatus.

FIG. 2 illustrates a function configuration of the information processing apparatus 100 according to the present exemplary embodiment. Each processing unit will be described below.

The reception unit 201 receives data (material data) for generating a virtual viewpoint image from the auxiliary storage device 104 internally or externally connected to the information processing apparatus 100. In response to a request from the image generation unit 205 (described below), the reception unit 201 transmits the received material data to the image generation unit 205.

An event information acquisition unit 202 performs processing for acquiring event information related to the virtual viewpoint image. The event information refers to, for example, information for identifying the type and characteristics of the target event, such as a sport game, concert, or drama. The event information may include, for example, major category information indicating the type of the target event, such as a sport game, concert, or drama. The major category of sports may include minor category information indicating sport games, such as athletics, soccer, baseball, karate, and sumo. The information included in the event information is not limited to the above-described example. For example, the major category information for sports may include intermediate category information, i.e., such classifications as field events (e.g., soccer and rugby) and martial arts (e.g., karate, judo, and kendo). For example, the event information may also include more detailed information such as sport items, the number of players, and the space of the stadium. The event information according to the present exemplary embodiment is included in material data files received by the reception unit 201, or is acquired as different data associated with the material data files. The event information acquisition unit 202 analyzes the material data files received by the reception unit 201 to acquire the event information corresponding to the material data. However, the method for acquiring the event information is not limited thereto. For example, the event information acquisition unit 202 may subject a plurality of captured images to image recognition and feature quantity extraction to identify an event and generate the event information corresponding to the identified event. Also, the event information acquisition unit 202 may be configured to acquire the event information, for example, according to an input from the operation unit 206. The event information acquisition unit 202 transmits the acquired event information to a UI determination unit 203.

Based on the event information transmitted from the event information acquisition unit 202, the UI determination unit 203 determines the UI to be generated by a UI generation unit 204. UIs according to the present exemplary embodiment refer to screens displayed by the display unit 207. By using UIs according to the present exemplary embodiment, the user can efficiently perform operations for generating a desired virtual viewpoint image for each event. For example, the information processing apparatus 100 according to the present exemplary embodiment can generate a plurality of types of UIs, such as the UI for soccer, the UI for 100-meter sprint, and the UI for karate, as UIs according to the event information. The information processing apparatus 100 according to the present exemplary embodiment can generate the default UI which can be used for general purposes regardless of the event information in addition to the UI according to the event information. Examples of UIs will be described in detail below. The UI determination unit 203 manages information for associating each piece of event information with each event UI. Upon acquisition of the event information from the event information acquisition unit 202, the UI determination unit 203 determines whether the UI corresponding to the acquired event information is present. When the UI corresponding to the event information is present, the UI determination unit 203 instructs the UI generation unit 204 to generate the UI corresponding to the event information. When the UI corresponding to the event information is absent, the UI determination unit 203 instructs the UI generation unit 204 to generate the default UI. The UI generation unit 204 generates the UI determined by the UI determination unit 203 and instructs the display unit 207 to display the UI.

The image generation unit 205 generates a virtual viewpoint image based on the material data acquired from the reception unit 201 and the user operation performed on the operation unit 206. The operation unit 206 is an input apparatus corresponding to the operation unit 106 illustrated in FIG. 1. The operation unit 206 determines the position, direction, and visual field size (viewing angle) of an arbitrary viewpoint (virtual viewpoint) in the imaging region subjected to imaging by the plurality of imaging apparatuses, based on a user operation on the input apparatus. The operation unit 206 transmits information indicating the viewpoint position of the determined virtual viewpoint, the line-of-sight direction from the virtual viewpoint, and the viewing angle of the virtual viewpoint as virtual viewpoint information to the image generation unit 205. The image generation unit 205 acquires necessary material data from the reception unit 201 according to the virtual viewpoint information transmitted from the operation unit 206. Based on the acquired material data and the virtual viewpoint information, the image generation unit 205 generates a virtual viewpoint image viewed from the virtual viewpoint indicated by the virtual viewpoint information, and instructs the display unit 207 to display the virtual viewpoint image. The display unit 207 superimposes the virtual viewpoint image generated by the image generation unit 205 on the UI generated by the UI generation unit 204, and displays the resultant image. The user can operate the input apparatus according to the UI while viewing the virtual viewpoint image displayed on the display unit 207. The virtual viewpoint information does not necessarily need to indicate the viewpoint position of the virtual viewpoint, the line-of-sight direction from the virtual viewpoint, and the viewing angle of the virtual viewpoint. The virtual viewpoint information only needs to indicate at least either one of the viewpoint position of the virtual viewpoint and the line-of-sight direction from the virtual viewpoint.

Figure 3:
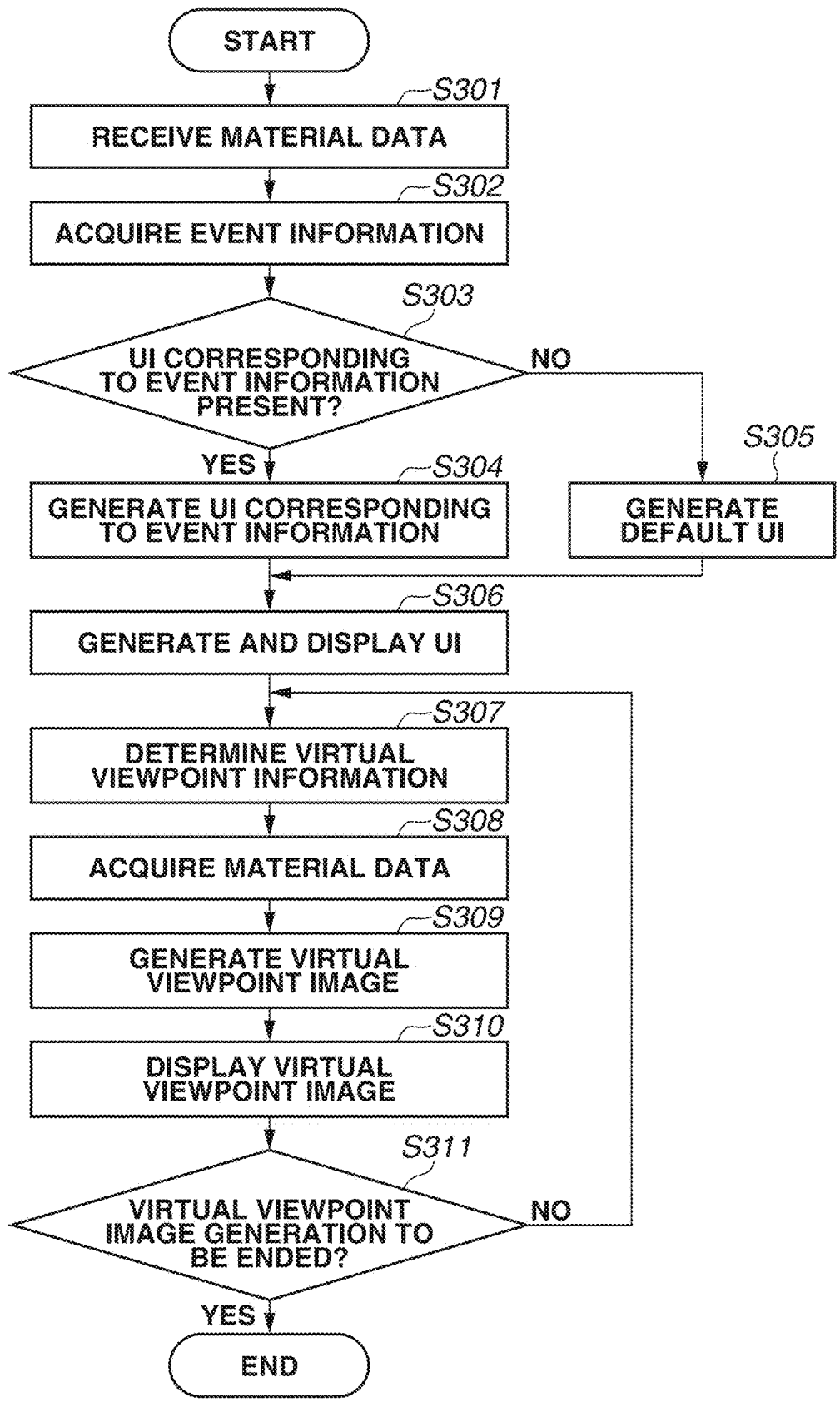
FIG. 3 is a flowchart illustrating processing performed by the information processing apparatus.

FIG. 3 is a flowchart illustrating processing performed by the information processing apparatus 100. The following processing is implemented when the CPU 101 reads a program stored in the ROM 103 or the auxiliary storage device 104 and then executes the program. Hereinafter, the step number of each step of processing starts with "S". When the information processing apparatus 100 detects an input of a user instruction for starting the virtual viewpoint image generation, the processing of this flowchart starts.

In step S301, the reception unit 201 receives the material data for generating a virtual viewpoint image from the auxiliary storage device 104. In step S302, the event information acquisition unit 202 acquires the event information corresponding to the material data received by the reception unit 201, and transmits the event information to the UI determination unit 203. In step S303, the UI determination unit 203 determines whether the UI corresponding the acquired event information is present. When the UI corresponding to the event information is present (YES in step S303), the processing proceeds to step S304. On the other hand, when the UI corresponding to the event information is absent (NO in step S303), the processing proceeds to step S305. In step S304, the UI determination unit 203 instructs the UI generation unit 204 to generate the UI corresponding to the event information. In step S305, the UI determination unit 203 instructs the UI generation unit 204 to generate the default UI. In step S306, the UI generation unit 204 generates a UI according to the contents of the instruction from the UI determination unit 203 and instructs the display unit 207 to display the UI. In step S307, the operation unit 206 determines the virtual viewpoint information indicating the viewpoint position of the virtual viewpoint, the line-of-sight direction from the virtual viewpoint, and the viewing angle of the virtual viewpoint based on a user operation on the input apparatus. The operation unit 206 transmits the determined virtual viewpoint information to the image generation unit 205. In step S308, according to the virtual viewpoint information transmitted from the operation unit 206, the image generation unit 205 acquires from the reception unit 201 the material data necessary to generate the virtual viewpoint image corresponding to the virtual viewpoint information. In step S309, the image generation unit 205 generates a virtual viewpoint image based on the acquired material data and virtual viewpoint information. In step S310, the image generation unit 205 superimposes the virtual viewpoint image generated in step S309 on the UI displayed on the display unit 207. In step S311, the information processing apparatus 100 determines whether an input of a user instruction for ending the virtual viewpoint image generation is detected. When an input of the user instruction is detected (YES in step S311), the information processing apparatus 100 ends the processing. On the other hand, when an input of the user instruction is not detected (NO in step S311), the processing returns to step S307. The information processing apparatus 100 performs the processing in step S307 and the subsequent steps again.

<Types of Material Data and Method for Generating Material Data>

According to the present exemplary embodiment, the material data includes images captured by imaging apparatuses and data generated based on the captured images. Examples of data generated based on the captured images include foreground and background image data extracted from the captured images, three-dimensional model data representing the shape of an object in a three dimensional space, and texture data for coloring the three-dimensional model. A foreground image is an object region (foreground region) extracted from an image captured by an imaging apparatus. An object extracted as a foreground region refers to a moving object (moving body) of which the absolute position and shape can change in a case where image capturing is performed from the same direction in time series. Examples of objects include persons (players and referees) in the field in field sports, balls in ball games, and singers, players, performers, and hosts in concerts and entertainments. The background image refers to the image in a region (background region) at least different from the object of the foreground. More specifically, the background image refers to an image in a state where foreground objects are removed from the captured image. The background refers to an imaging target subject which stands still or continuously is almost motionless when image capturing is performed from the same direction in time series. Examples of such imaging target subjects include stages in concerts, stadiums where events are held, and structures such as goals and fields in ball games. However, the background refers to a region at least different from foreground objects, imaging target subjects may include objects other than objects and the background. Three-dimensional model data refers to the above-described object data represented in three-dimensional shape.

An example of a method for generating material data by a material data generation unit (not illustrated) will be described below. The material data generation unit may be incorporated in the information processing apparatus 100 or externally connected as a different apparatus to the information processing apparatus 100.

An example of a method for generating a foreground image and a background image by the material data generation unit will be described below. The material data generation unit compares a plurality of images captured in succession by the plurality of imaging apparatuses, to detect a region where the pixel value remains unchanged. The material data generation unit determines the detected region as the background region and generates the background image based on the detected region. The material data generation unit also compares the generated background image with the captured image. When the difference in the image value in a region is equal to or larger than a predetermined threshold value, the material data generation unit determines the region as the foreground region and generates the foreground image based on the region.

An example of a method for generating a three-dimensional model of an object corresponding to the foreground region by the material data generation unit will be described below. The material data generation unit generates a silhouette image of the object based on the foreground and background regions determined in the above-described processing. Each of the foreground and background regions is represented in binary form in the silhouette image. In this case, by using images captured from a plurality of directions, the material data generation unit generates a silhouette image of the object viewed from a plurality of directions. The material data generation unit generates a three-dimensional model by using a plurality of silhouette images by using the known visual hull (shape-from-silhouette).

This completes the description of material data types and the method for generating material data according to the present exemplary embodiment. The material data types are not limited as long as the data is intended to be used to generate a virtual viewpoint image. For example, the material data may include camera parameters representing imaging conditions of the imaging apparatuses for acquiring captured images. The material data may also be different for each method for generating a virtual viewpoint image. For example, the material data may be different between a case of generating a virtual viewpoint image by generating a three-dimensional model and a case of generating a virtual viewpoint image by using an image-based rendering method without using a three-dimensional model.

<UIs>

UIs generated by the UI generation unit 204 will be described in detail below. As examples of events to be subjected to the virtual viewpoint image generation, UIs for soccer, 100-meter sprint, and karate in the sport category will be described below.

Figure 4:
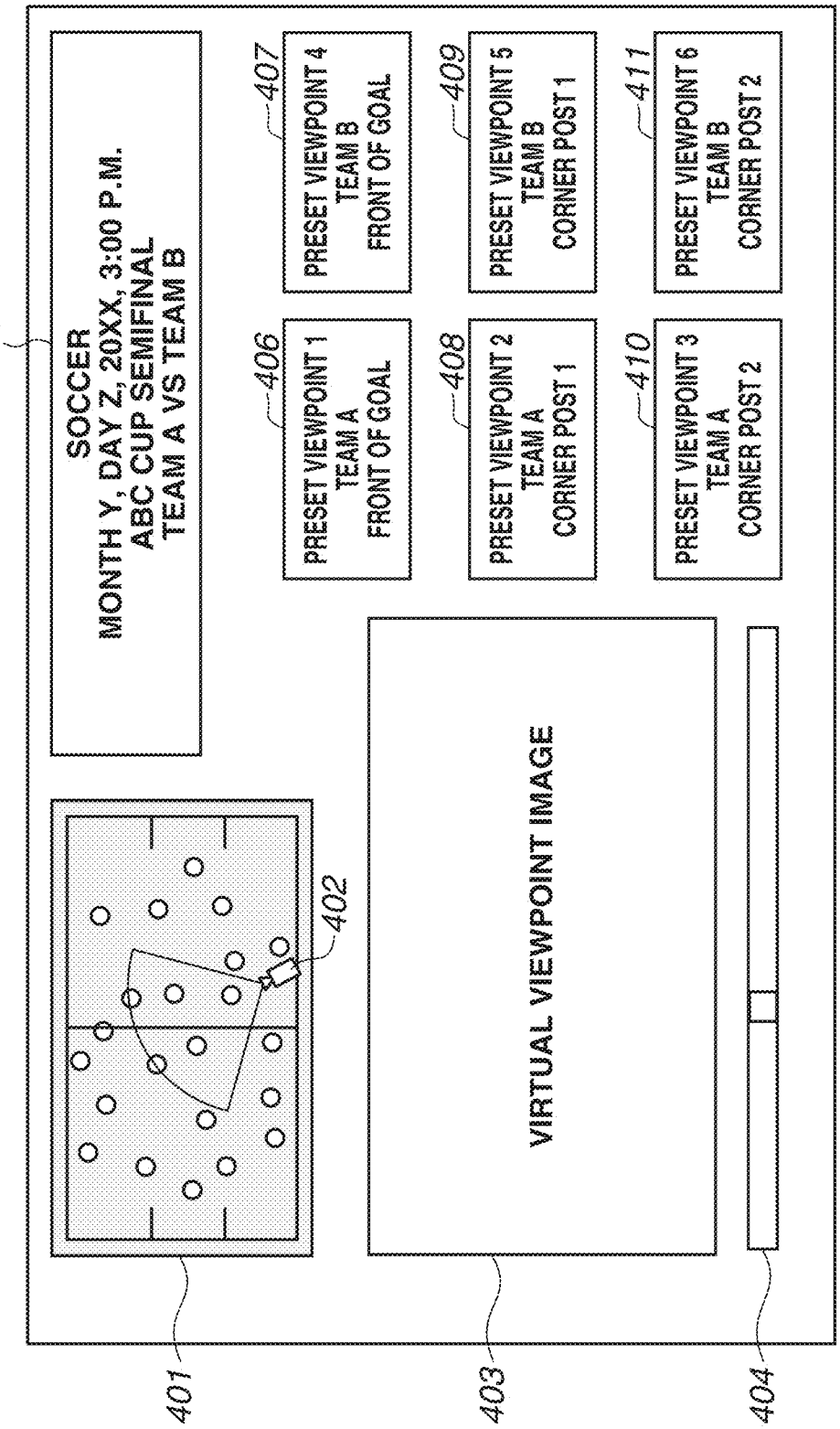
FIG. 4 illustrates an example of a user interface (UI) corresponding to soccer.

FIG. 4 illustrates an example of a UI for soccer. A position map 401 is an image indicating the overview of the entire imaging region to be captured by the plurality of imaging apparatuses. Referring to FIG. 4, the position map 401 is an image illustrating the overview of the entire field where a soccer game is being held. The position map 401 includes the positions of players, and virtual viewpoint information 402 representing the viewpoint position of the virtual viewpoint, the line-of-sight direction from the virtual viewpoint, and the viewing angle of the virtual viewpoint. The image displayed in the position map 401 may be a virtual viewpoint image generated based on the images captured by the plurality of imaging apparatuses or a drawing simply representing the field. The image displayed in the position map 401 only needs to enable the user to grasp the positional relations between players and the virtual viewpoint information, and seats and irrelevant structures may be omitted. The position of each player can be calculated based on the images captured by the plurality of imaging apparatuses. A window 403 displays the virtual viewpoint image viewed from the virtual viewpoint corresponding to the virtual viewpoint information 402. The virtual viewpoint information 402 moves in association with a user's input operation for determining the virtual viewpoint information. A seek bar 404 indicates the time position in the reproduction time of the virtual viewpoint image. A title 405 indicates information about the virtual viewpoint image content currently being subjected to the generation processing. For example, the information about the virtual viewpoint image content is, for example, the event name, the date and time when the event image was captured, and details of the event (including the game's name and opposing team). The information about the virtual viewpoint image content may be information based on the event information or may be information input through the input apparatus, such as a keyboard, by the user. By operating the input apparatus while viewing the position map 401 and the window 403, the user can generate an arbitrary virtual viewpoint image while confirming the positional relations between players and the virtual viewpoint. Preset viewpoint windows 406 to 411 enable the user to specify predetermined virtual viewpoint information. Each of the preset viewpoint windows 406 to 411 displays the virtual viewpoint image generated based on preregistered predetermined virtual viewpoint information (preset viewpoint), and the name of the preset viewpoint (e.g., a text such as "Team A, Front of Goal"). By performing an operation for specifying the window of the target viewpoint from among the preset viewpoint windows 406 to 411, the user can instantaneously display the virtual viewpoint image corresponding to the specified preset viewpoint, in the window 403. The virtual viewpoint information corresponding to the specified preset viewpoint is reflected to the virtual viewpoint information 402 in the position map 401, and the virtual viewpoint information 402 moves to the position of the preset viewpoint. In the example illustrated in FIG. 4, as preset viewpoints, there is prepared virtual viewpoint information including viewpoints for viewing the goals from the from of the goals and viewpoints around the corner posts. In addition to the example viewpoints illustrated in FIG. 4, preset viewpoints which can be registered include a viewpoint for viewing the center circle and viewpoints for viewing the goals from the back of the goals. A viewpoint reproducing the line of sight of a specific person, such as a referee or a goal keeper, may also be registered. A viewpoint for chasing a player or a ball may also be registered. The virtual viewpoint information corresponding to the preset viewpoint may be constantly displayed in the position map 401 like the virtual viewpoint information 402. In this case, the virtual viewpoint information 402, and the virtual viewpoint information corresponding to the preset viewpoint may be displayed in different colors.

Figure 5:
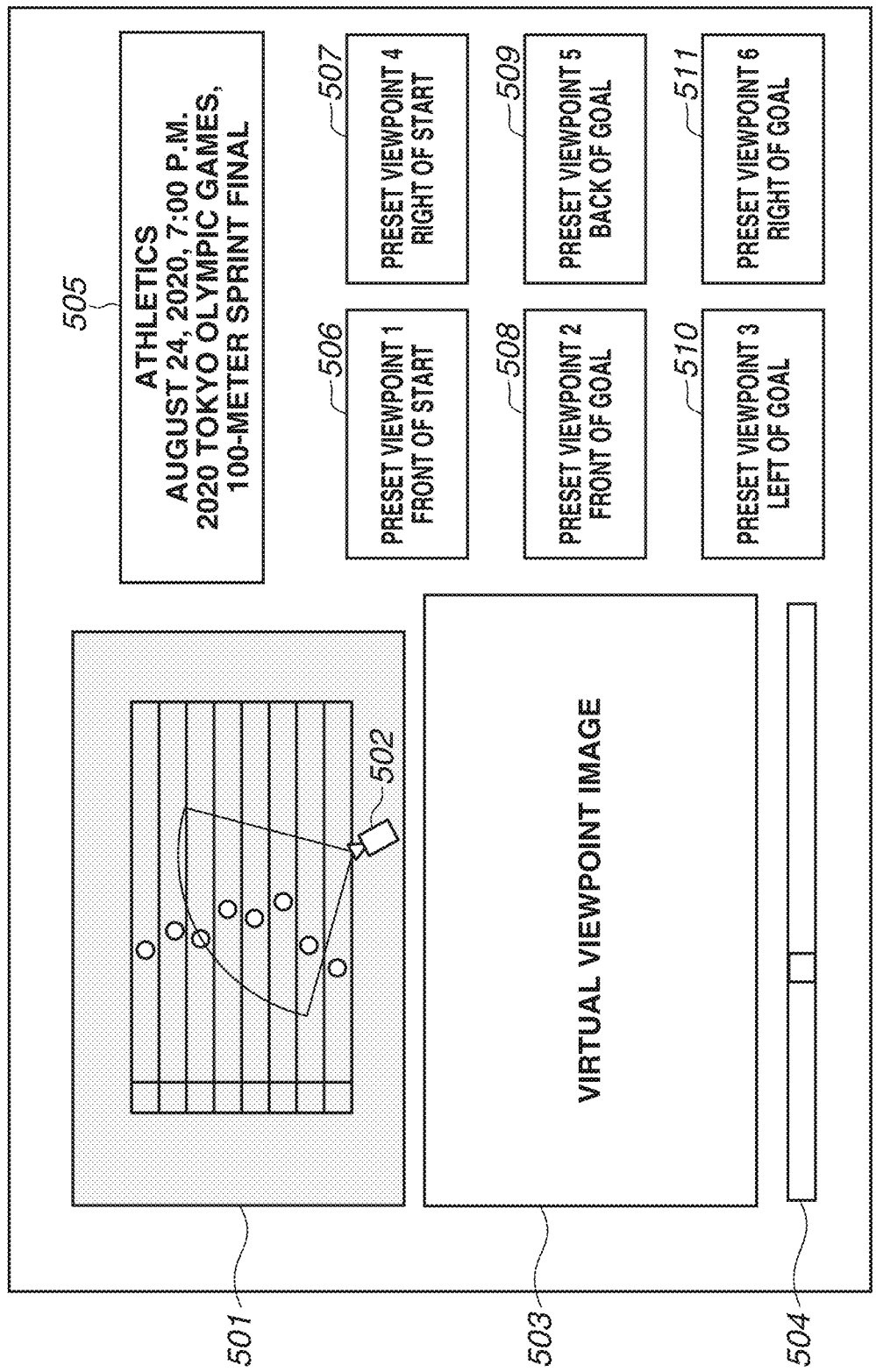
FIG. 5 illustrates an example of a UI corresponding to a 100-meter sprint.

FIG. 5 illustrates an example of a UI for a 100-meter sprint. The UI illustrated in FIG. 5 includes a position map 501 including virtual viewpoint information 502, a window 503, a seek bar 504, a title 505, and preset viewpoint windows 506 to 511. Examples of preset viewpoints corresponding to a 100-meter sprint which can be registered include viewpoints for viewing the start and goal points from a plurality of directions. A viewpoint moving parallel to players may also be registered. The above-described UI for a 100-meter sprint differs from the UI for soccer in the virtual viewpoint information selected based on a specification on the preset viewpoint window. Providing operation screens with different operations to be associated with components (e.g., preset viewpoint windows) included in UI display screens makes it easier for the user to perform operations.

Figure 6:
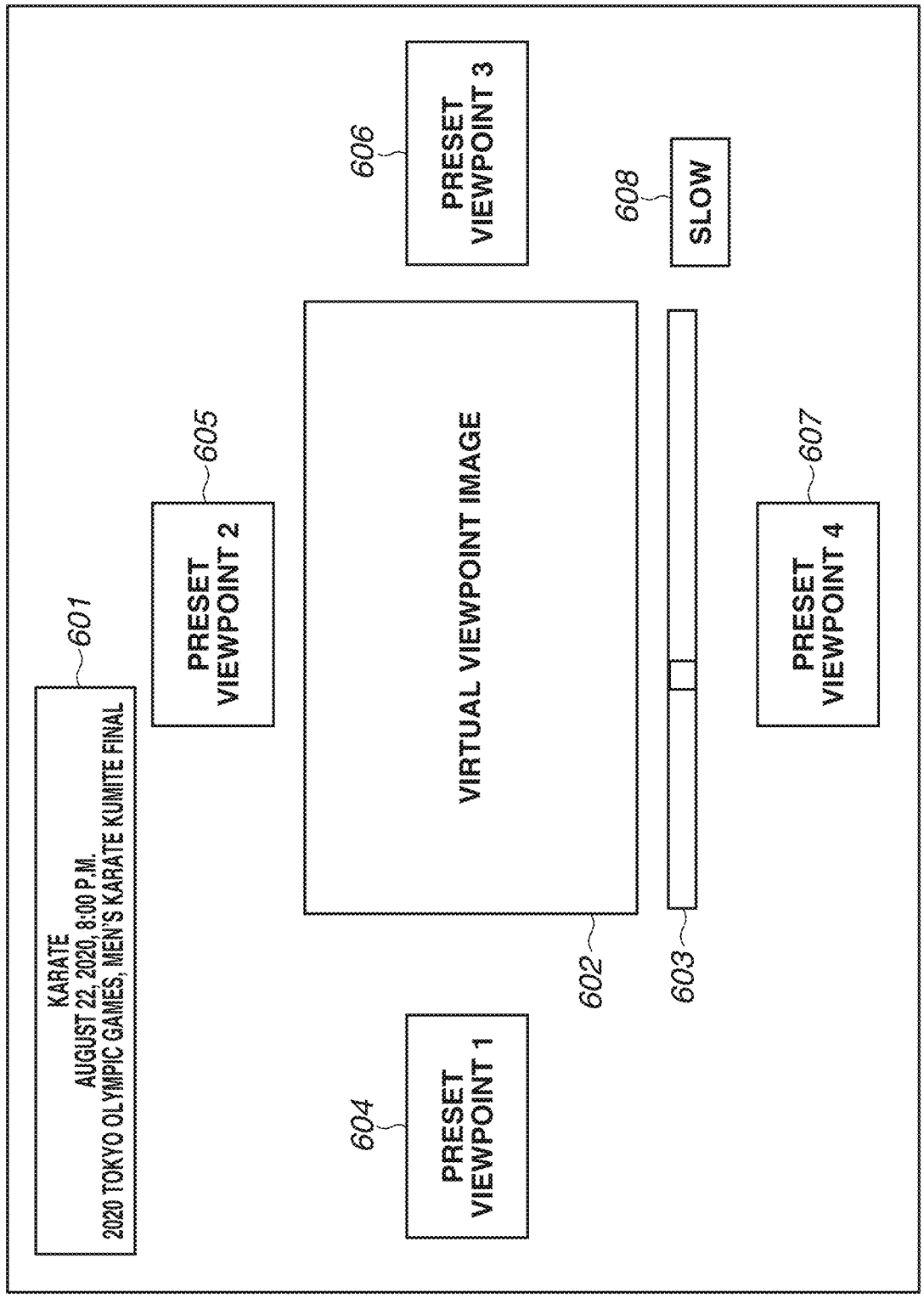
FIG. 6 illustrates an example of a UI corresponding to karate.

FIG. 6 illustrates an example of a UI for karate. The UI illustrated in FIG. 6 includes a title 601, a window 602, a seek bar 603, preset viewpoint windows 604 to 607, and a Slow button 608. The preset viewpoint windows 604 to 607 are arranged around the window 602 for displaying the virtual viewpoint image, and display viewpoints for viewing the karate stadium from four directions. For example, when an athlete is displayed in the window 602, the user can specify any one of the preset viewpoint windows 604 to 607 to instantaneously select a viewpoint for viewing the athlete from the direction of the specified preset viewpoint window. Arranging the preset viewpoint windows in association with the viewpoint positions of the virtual viewpoints in this way enables the user to intuitively select the target virtual viewpoint. The Slow button 608 is used to decrease the reproduction speed of the moving image of the virtual viewpoint image. When the user specifies the Slow button 608, the reproduction speed of the moving image decreases. When the user specifies the Slow button 608 again, the normal reproduction speed is resumed. This function makes it easier for the user to specify the generation of a virtual viewpoint image for slowly reproducing a scene in which a karate technique succeeded. The above-described Slow button may be used in the other event UIs. In addition to the example preset viewpoints illustrated in FIG. 6, preset viewpoints which can be registered include a viewpoint for viewing the stadium from a fixed position and a viewpoint for reproducing the line of sight of a player. A viewpoint changing based on the positional relation between the two players may also be registered as a preset viewpoint. Examples of viewpoints changing based on the positional relation between the players include a viewpoint in which the two players are included in the viewing angle and a viewpoint for constantly viewing a specific player from the back of the player. The above-described UI for karate differs from the UIs corresponding to soccer and a 100-meter sprint in the positions of the window and the preset viewpoint windows. Providing operation screens with a different layout of components (e.g., the window 602 or the preset viewpoint windows 604 to 607) of the UI display screen makes it easier for the user to perform operations.

An example of a default UI will be described below. The default UI includes a window for displaying the virtual viewpoint image, a seek bar indicating the time position in the reproduction time of the virtual viewpoint image, and a title indicating information about the virtual viewpoint image content. The default UI only needs to be used for general purposes regardless of the event information, and the content of the default UI is not limited to the above-described example.

Examples of UIs having different display screens for each event have been described above. In addition, it is desirable that the UI corresponding to rugby includes a position map and that a viewpoint for viewing the player who starts a series of passes is registered as a preset viewpoint. A preset viewpoint for chasing a specific player or a ball may be registered as a UI corresponding to ball games. UIs corresponding to concerts and dramas may include a seat map representing a seating chart. When the user specifies a seat, the virtual viewpoint image viewed from the specified seat may be generated. With respect to concert stages and drama platforms, viewpoints for viewing the upper part on the stage left, the lower part on the stage left, the upper part on the stage right, and the lower part on the stage right may also be registered as preset viewpoints. Viewpoints around the performers of concerts and dramas (for example, viewpoints in a case of viewing from the front or side) may be registered as preset viewpoints. The preset viewpoint windows in the above-described examples display the virtual viewpoint images viewed from the respective registered virtual viewpoints, the present disclosure is not limited thereto. With respect to the information displayed in each of the preset viewpoint windows, at least either one of the virtual viewpoint image corresponding to the preset viewpoint and the name of the preset viewpoint may be displayed. For example, only the virtual viewpoint image may be displayed in each of the preset viewpoint windows. If the virtual viewpoint image corresponding to the preset viewpoint is not displayed, a button describing the name text (e.g., "Team A, Front of Goal") may be displayed. The information processing apparatus 100 may be configured to provide the user with UIs using arbitrary components based on the components of operation screens according to different imaging target subjects. For example, the information processing apparatus 100 may maintain the position map, the preset viewpoint windows, the seek bar, the Slow button, and other components, and generate an operation screen including arbitrary components according to the event information.

In the configuration according to the present exemplary embodiment, the information processing apparatus 100 provides the user with different operation screens for generating virtual viewpoint images related to different imaging target subjects (events) as user interfaces for generating virtual viewpoint images. This enables the user to efficiently perform control for generating a virtual viewpoint image for each event. Although the UI determination unit 203 according to the present exemplary embodiment determines the UI based on information for associating the event information with even UIs, the UI determination method is not limited thereto. The UI determination unit 203 may be configured to determine a UI when, after notifying the user of the event information, the user performs an operation for specifying the UI. In this case, for example, the UI determination unit 203 instructs the display unit 207 to display the event information acquired by the event information acquisition unit 202.

The information processing apparatus 100 does not necessarily need to be configured to acquire the event information. For example, if the event subjected to the virtual viewpoint image generation is constantly known to be soccer, the information processing apparatus 100 only needs to be configured to constantly generate the UI for soccer without acquiring the event information. The information processing apparatus 100 may be configured to generate a specific UI in this way. The information processing apparatus 100 may also be configured to determine a UI based on a user operation without acquiring the event information. For example, the user may select an arbitrary UI by operating the input apparatus having UI specification buttons supplied with labels for soccer, 100-meter sprint, and karate. The UI specification buttons provided on the input apparatus do not necessarily need to be supplied with labels for soccer, 100-meter sprint, and karate. When generating a virtual viewpoint image, the user may press a plurality of UI specification buttons to select an arbitrary UI. In addition, the user may select an arbitrary UI by using the input apparatus having a UI selector button for switching between the UIs each time the button is pressed.

Although the present exemplary embodiment has been described above centering on an example of the information processing apparatus 100 for generating different UIs for generating virtual viewpoint images related to different events, the present disclosure is not limited thereto. For example, the information processing apparatus 100 may be configured to offer different user interfaces according to different imaging locations (e.g., field, concert hall, stage, and gymnasium) as imaging target subjects.

A part of the processing units included in the information processing apparatus 100 according to the present exemplary embodiment may be externally connected as a different apparatus to the information processing apparatus 100. For example, at least either one of the operation unit 206 and the display unit 207 may be configured to be externally connected to the information processing apparatus 100.

The first exemplary embodiment has been described above centering on an example of the information processing apparatus 100 for providing the user with different operation screens for generating virtual viewpoint images related to different imaging target subjects as UIs for generating virtual viewpoint images. A second exemplary embodiment will be described below centering on an example of the information processing apparatus 100 for providing the user with the input apparatus for enabling different operations for generating virtual viewpoint images related to different imaging target subjects as UIs for generating virtual viewpoint images. Functions of the input apparatus of the information processing apparatus 100, i.e., functions for supporting user input operations (hereinafter referred to as auxiliary functions) for each event will be described below. The following functions according to the present exemplary embodiment are applicable to the information processing apparatus 100 according to the first exemplary embodiment. In the descriptions of the processing units of the information processing apparatus 100, the same reference numerals as those according to the first exemplary embodiment will also be used.

Figure 7:
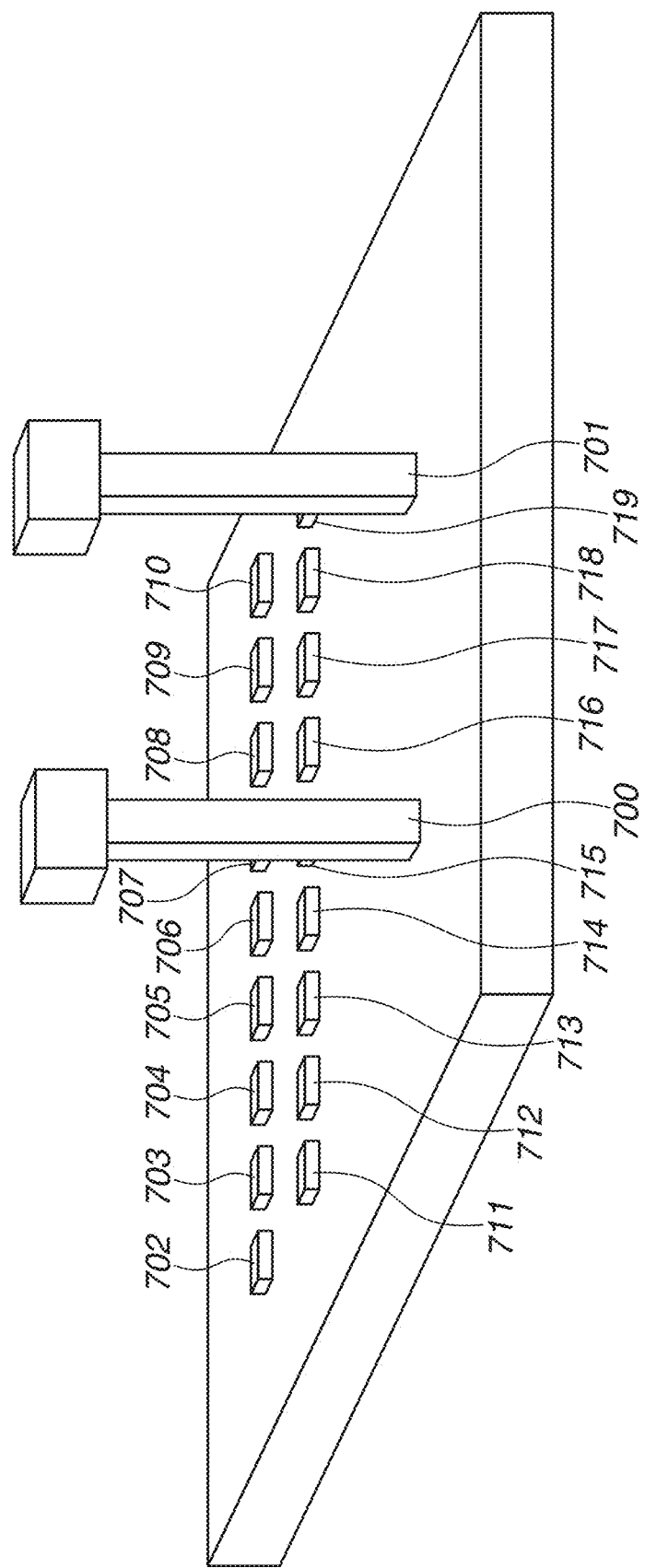
FIG. 7 illustrates an example of an input apparatus configuring an operation unit.

FIG. 7 illustrates an example of the input apparatus (controller) configuring the operation unit 206. The input apparatus illustrated in FIG. 7 includes levers 700 and 701 and buttons 702 to 719. The levers 700 and 701 are assigned, for example, an operation for changing the viewpoint position of the virtual viewpoint and an operation for changing the line-of-sight direction from the virtual viewpoint. The buttons 702 to 719 are assigned, for example, an operation for changing the viewing angle of the virtual viewpoint and an operation for specifying predetermined virtual viewpoint information (preset viewpoint). The operation for specifying a preset viewpoint is an operation for specifying predetermined virtual viewpoint information for each event. For example, when the event subjected to the virtual viewpoint image generation is soccer, an operation for specifying the viewpoint of the front of a goal or the viewpoint around a corner post as a preset viewpoint is assigned to any one of the buttons 702 to 719. The above-described configuration enables the user to determine the viewpoint position of the virtual viewpoint, the line-of-sight direction from the virtual viewpoint, and the viewing angle of the virtual viewpoint by operating the input apparatus illustrated in FIG. 7. The levers 700 and 701 and the buttons 702 to 719 can be assigned the auxiliary functions for each event. Examples of the auxiliary functions will be described below.

As an example of the auxiliary functions, a method for controlling the variation of the viewpoint position of the virtual viewpoint or the variation of the line-of-sight direction from the virtual viewpoint for each event will be described below. For example, when the user changes the viewpoint position of the virtual viewpoint to move across the imaging region, the variation of the viewpoint position of the virtual viewpoint increases with increasing imaging region. Therefore, the variation of the viewpoint position of the virtual viewpoint corresponding to the operation amounts of the levers 700 and 701 is increased depending on the space of the region where the event is held. This enables the user, for example, to quickly move the viewpoint position of the virtual viewpoint even with a large stadium such as a soccer stadium. In addition, the variation of the viewpoint position of the virtual viewpoint may be set depending on the moving speed of the imaging target object in the event. For example, for events where athletes quickly move, such as ice hockey, the variation of the viewpoint position of the virtual viewpoint corresponding to the operation amounts of the levers 700 and 701 is increased. This enables the user to move the virtual viewpoint to chase an athlete even when the athlete quickly moves. Alternatively, for events where athletes quickly move, the variation of the line-of-sight direction from the virtual viewpoint corresponding to the operation amounts of the levers 700 and 701 is increased. This enables the user to change the line-of-sight direction from the virtual viewpoint to quickly notice a certain athlete. As described above, by differentiating at least either one of the variations of the viewpoint position of the virtual viewpoint and the line-of-sight direction from the virtual viewpoint, corresponding to the operation amounts of the levers, the user can perform most suitable input operations for each event. A certain button may be assigned an operation for turning control of the variation of the viewpoint position of the virtual viewpoint or the line-of-sight direction from the virtual viewpoint ON and OFF.

As another example of the auxiliary functions, automatic virtual viewpoint operations for each event will be described below. In the case of soccer, for example, the user sets an automatic operation for moving the virtual viewpoint around each player centering on the player. This automatic operation moves the virtual viewpoint around a specific player from the lateral side, making it easier to generate a virtual viewpoint image for viewing the player from different directions. In the case of a 100-meter sprint, the user sets an automatic operation for moving the virtual viewpoint in parallel with an athlete, making it easier to generate a virtual viewpoint image in which the virtual viewpoint parallelly moves to view the athlete from the lateral side. In addition to the above-described examples, in ball games such as rugby, the user may set an automatic operation for constantly orienting the line-of-sight direction from the virtual viewpoint toward a player or the ball, and manually set the viewpoint position of the virtual viewpoint. For example, in sports using fixed lanes, such as a 400-meter relay, the user may set an automatic operation for moving the viewpoint position of the virtual viewpoint along the lanes, and manually set the line-of-sight direction from the virtual viewpoint. It is conceivable that the type of the automatic operation to be used is different for each event. Therefore, by assigning a frequently-used automatic operation to a button of the input apparatus for each event, the user can efficiently perform an operation for generating a virtual viewpoint image for each event.

As another example of the auxiliary functions, a method for limiting the variations of the viewpoint position of the virtual viewpoint and the line-of-sight direction from the virtual viewpoint. For example, when moving the virtual viewpoint in parallel with an athlete in a 100-meter sprint through a manual operation, limiting the vertical movement of the viewpoint position of the virtual viewpoint enables preventing the vertical fluctuation of the viewpoint position of the virtual viewpoint moving in parallel with the athlete. Also, in the example, fixing the line-of-sight direction from the virtual viewpoint moving in parallel with the athlete enables preventing the fluctuation of the line-of-sight direction from the virtual viewpoint. By assigning an operation for limiting the variation of at least either one of the viewpoint position of the virtual viewpoint and the line-of-sight direction from the virtual viewpoint to a button of the input apparatus, unnecessary movements of the virtual viewpoint can be prevented when the user performs an input operation for determining the virtual viewpoint.

With the configuration according to the present exemplary embodiment, the information processing apparatus 100 provides the user with an input apparatus enabling different operations for generating virtual viewpoint images related to different imaging target subjects (events) as a user interface for generating a virtual viewpoint image. According to the event information acquired by the event information acquisition unit 202, the above-described auxiliary functions are assigned to the input apparatus by the UI generation unit 204 and are provided for the user. This makes it easier to efficiently perform control to generate a desired virtual viewpoint image for each event. The UI generation unit 204 may instruct the display unit 207 to display an auxiliary function button, and the auxiliary function may be performed when the user specifies the auxiliary function button.

The information processing apparatus 100 according to the present exemplary embodiment may not necessarily need to be configured to acquire the event information. For example, if the event subjected to the virtual viewpoint image generation constantly remains the same, there may be provided an input apparatus assigned a specific operation without acquiring the event information. In addition, the auxiliary storage device 104 may store a plurality of methods for assigning the auxiliary functions to the input apparatus, enabling the user to specify an arbitrary method for assigning the auxiliary functions. For example, the auxiliary storage device 104 may store an operation assignment pattern A (an automatic function for the virtual viewpoint is provided, and a function of limiting the variation of the virtual viewpoint is not provided) and an operation assignment pattern B (the automatic function for the virtual viewpoint is not provided, and the function of limiting the variation of the virtual viewpoint is provided), and the user specifies either pattern. In addition, buttons for turning the auxiliary functions ON and OFF are provided, and the user can turn ON only desired auxiliary functions.

The present exemplary embodiment has been described above centering on an example of the information processing apparatus 100 for generating different UIs for generating virtual viewpoint images related to different events, the present disclosure is not limited thereto. For example, the information processing apparatus 100 may be configured to provide different user interfaces according to different imaging locations (e.g., field, concert hall, stage, and gymnasium) as imaging target subjects. In this case, for example, the information processing apparatus 100 may perform control to quickly move the virtual viewpoint depending on the space of the imaging location, and limit the moving range of the virtual viewpoint.

A third exemplary embodiment will be described below centering on the image processing apparatus 100 for providing UIs for generating virtual viewpoint images by using speech recognition (hereinafter UIs of this type are referred to as audio UIs) as UIs for generating virtual viewpoint images. The hardware and the function configurations of the information processing apparatus 100 according to the present exemplary embodiment are similar to those according to the first and the second exemplary embodiments, and redundant descriptions thereof will be omitted.

The operation unit 206 of the information processing apparatus 100 includes a microphone as an input apparatus configuring the operation unit 206. The information processing apparatus 100 analyzes the voice input to the microphone to perform speech recognition. The information processing apparatus 100 also generates a virtual viewpoint image based on the result of the speech recognition. By uttering a sound to the microphone, the user can instruct the information processing apparatus 100 to generate a desired virtual viewpoint image.

An example of the information processing apparatus 100 for providing a plurality of audio UIs for generating virtual viewpoint images related to different imaging target subjects will be described below. As an example of an imaging target subject, the information processing apparatus 100 for providing different audio UIs for each event will be described below.

The information processing apparatus 100 stores association information in which a word is associated with the virtual viewpoint information for each event, in the auxiliary storage device 104. As the association information for soccer, for example, a word "Team A, Front of Goal" is associated with the virtual viewpoint information corresponding to the viewpoint for viewing the goal from the front of the goal on the Team A side. As the association information for karate, for example, a word "Referee's Line of Sight" is associated with the virtual viewpoint information corresponding to the referee's line of sight. The information processing apparatus 100 determines association information to be used as an audio UI from among the above-described plurality of pieces of association information based on the event information acquisition or a user's specification operation. When the information processing apparatus 100 detects audio input by the user, the information processing apparatus 100 recognizes an input audio word through speech analysis and determines whether the recognized word is present in the determined association information. When the information processing apparatus 100 determines that the recognized word is present in the determined association information, the information processing apparatus 100 generates a virtual viewpoint image by using the virtual viewpoint information corresponding to the word. When the information processing apparatus 100 determines that the recognized word is absent, the information processing apparatus 100 may perform no processing or output error information. An example case of using the association information for soccer will be described below. When the user utters "Team A, Front of Goal" to the microphone, the information processing apparatus 100 instructs the display unit 207 to display the virtual viewpoint image generated based on the virtual viewpoint information corresponding to the front of the goal. An example case of using the association information for karate will be described below. When the user utters "Referee's Line of Sight" to the microphone, the information processing apparatus 100 instructs the display unit 207 to display the virtual viewpoint image generated based on the virtual viewpoint information corresponding to the referee's line of sight. In this way, the information processing apparatus 100 associates a word with the virtual viewpoint information for each event and generates the corresponding virtual viewpoint image according to the input audio word. The above-described association information is to be considered as illustrative. The user may associate any desired number of pieces of association information with each event. The use of the association information makes it possible to associate the same word with different virtual viewpoint information for different events. For example, it is assumed that soccer and rugby are different in the viewpoint position of the virtual viewpoint and the line-of-sight direction from the virtual viewpoint for viewing the goal. In this case, the same word "Front of Goal" can be associated with different pieces of virtual viewpoint information between the audio UI for soccer and the audio UI for rugby.

For example, when the user utters the name of a player to an input speaker, a virtual viewpoint for chasing the player or a virtual viewpoint for moving around the player may be automatically generated. As in the above-described example, the information processing apparatus 100 may associate an audio word with an automatic operation for the virtual viewpoint for each imaging a target subject.

Other Exemplary Embodiments

The first and the second exemplary embodiments have been described above centering on the information processing apparatus 100 which determines a user interface from among different user interfaces for generating virtual viewpoint images related to different imaging target subjects, and provides the user with the determined user interface. The use of the information processing apparatus 100 makes it possible to provide the user with a user interface for enabling the user to efficiently perform an operation for generating a virtual viewpoint image for each imaging target subject to be captured by the plurality of imaging apparatuses.

At least two of the first, second, and third exemplary embodiments may be combined. For example, the information processing apparatus 100 may be configured to provide the user with the operation screen according to the first exemplary embodiment and the input apparatus according to the second exemplary embodiment at the same time as a user interface. In addition, the user may manually configure an operation screen and freely customize the method for assigning an operation to the controller or microphone. The information processing apparatus 100 may also be configured to store the UI used by the user for each imaging target subject and to provide the user with a suitable UI based on the stored information. In this case, the information processing apparatus 100 may be configured to store information about the history of UI usages by the unspecified number of users, perform machine learning based on the stored information, and provide the user with a suitable UI for each imaging target subject. The information processing apparatus 100 may also perform the above-described machine learning for a specific user and provide the specific user with a suitable UI corresponding to the user.

The present disclosure makes it possible to provide the user with a user interface for enabling the user to efficiently perform an operation for generating a virtual viewpoint image for each imaging target subject to be captured by a plurality of imaging apparatuses.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-107089, filed Jun. 7, 2019, which is hereby incorporated by reference herein in its entirety.

What is claimed is:

1. An information processing apparatus comprising:
one or more processors functioning by executing instructions stored in one or more memories as the following units:
a determination unit configured to determine, from among a plurality of different user interfaces used for generating virtual viewpoint images corresponding to different types of imaging locations based on a plurality of captured images captured by a plurality of imaging apparatuses, a user interface corresponding to a type of an imaging location where the plurality of imaging apparatuses performs imaging; and
a provision unit configured to provide the user with the user interface determined by the determination unit,
wherein, as a user interface to be provided for the user, the determination unit determines an input unit to be provided for the user from among a plurality of input units enabling different operations, the plurality of input units being different in a setting for limiting a variation i) of at least one of a viewpoint position of a virtual viewpoint and a line-of-sight direction from the virtual viewpoint, ii) related to the virtual viewpoint image, iii) due to an input operation on the input unit, and
wherein the provision unit provides the user with the input unit determined by the determination unit.

2. The information processing apparatus according to claim 1, wherein the user interface enables a user operation for determining a viewpoint position of a virtual viewpoint and a line-of-sight direction from the virtual viewpoint, related to the virtual viewpoint image.

3. The information processing apparatus according to claim 1, wherein the determination unit determines a user interface corresponding to an event imaged by the plurality of imaging apparatuses from among the plurality of different user interfaces.

4. The information processing apparatus according to claim 3, wherein the event to be imaged by the plurality of imaging apparatuses is identified based on the plurality of captured images.

5. The information processing apparatus according to claim 1, further comprising a detection unit configured to detect a user operation for determining the user interface by the user, wherein the determination unit determines the user interface based on the user operation detected by the detection unit.

6. The information processing apparatus according to claim 1,
wherein, as a user interface to be provided for the user, the determination unit determines an operation screen to be provided for the user from among a plurality of operation screens different in at least either one of a layout of components on a display screen and an operation associated with the component, and
wherein the provision unit instructs a display unit to display the operation screen determined by the determination unit to provide the user with the operation screen.

7. The information processing apparatus according to claim 6, wherein the provision unit instructs the display unit to display an operation screen including, as the component, an image illustrating an overview of an entire imaging region imaged by the plurality of imaging apparatuses.

8. The information processing apparatus according to claim 1, wherein the determination unit determines an input unit to be provided for the user from among the plurality of input units different in a setting for an operation for automatically determining at least either one of a viewpoint position of a virtual viewpoint and a line-of-sight direction from the virtual viewpoint, related to the virtual viewpoint image.

9. A method for controlling an information processing apparatus, the method comprising:
determining, from among a plurality of different user interfaces used for generating virtual viewpoint images corresponding to different types of imaging locations based on a plurality of captured images captured by a plurality of imaging apparatuses, a user interface corresponding to a type of an imaging location where the plurality of imaging apparatuses performs imaging; and
providing the user with the user interface determined,
wherein, as a user interface to be provided for the user, determining an input to be provided for the user from among a plurality of inputs enabling different operations, the plurality of inputs being different in a setting for limiting a variation i) of at least one of a viewpoint position of a virtual viewpoint and a line-of-sight direction from the virtual viewpoint, ii) related to the virtual viewpoint image, iii) due to an input operation on the input, and
wherein the user with the input determined is provided.

10. A non-transitory computer-readable storage medium storing a program for causing a computer to execute a method, the method comprising:
determining, from among a plurality of different user interfaces used for generating virtual viewpoint images corresponding to different types of imaging locations based on a plurality of captured images captured by a plurality of imaging apparatuses, a user interface corresponding to a type of an imaging location where the plurality of imaging apparatuses performs imaging; and
providing the user with the user interface determined,
wherein, as a user interface to be provided for the user, determining an input to be provided for the user from among a plurality of inputs enabling different operations, the plurality of inputs being different in a setting for limiting a variation i) of at least one of a viewpoint position of a virtual viewpoint and a line-of-sight direction from the virtual viewpoint, ii) related to the virtual viewpoint image, iii) due to an input operation on the input, and
wherein the user with the input determined is provided.

11. An information processing apparatus comprising:
one or more processors functioning by executing instructions stored in one or more memories as the following units:
an acquisition unit configured to acquire information for specifying a type of an imaging target subject imaged by a plurality of imaging apparatuses;
a determination unit configured to determine, from among a plurality of different user interfaces used for generating virtual viewpoint images corresponding to different types of imaging target subjects based on a plurality of captured images captured by the plurality of imaging apparatuses, a user interface corresponding to a type of an imaging target subject specified based on the information acquired by the acquisition unit; and
a provision unit configured to provide the user with the user interface determined by the determination unit,
wherein, as a user interface to be provided for the user, the determination unit determines an input unit to be provided for the user from among a plurality of input units enabling different operations, the plurality of input units being different in a setting for limiting a variation i) of at least one of a viewpoint position of a virtual viewpoint and a line-of-sight direction from the virtual viewpoint, ii) related to the virtual viewpoint image, iii) due to an input operation on the input unit, and
wherein the provision unit provides the user with the input unit determined by the determination unit.

12. An information processing apparatus comprising:
one or more processors functioning by executing instructions stored in one or more memories as the following units:
a determination unit configured to determine, from among a plurality of different user interfaces used for generating virtual viewpoint images corresponding to different types of imaging target subjects based on a plurality of captured images captured by a plurality of imaging apparatuses, a user interface for enabling a user to specify at least one of a viewpoint position of a predetermined virtual viewpoint and a line-of-sight direction from the predetermined virtual viewpoint corresponds to a type of an imaging target subject imaged by the plurality of imaging apparatuses;
a provision unit configured to provide the user with the user interface determined by the determination unit,
wherein, as a user interface to be provided for the user, the determination unit determines an input unit to be provided for the user from among a plurality of input units enabling different operations, the plurality of input units being different in a setting for limiting a variation i) of at least one of a viewpoint position of a virtual viewpoint and a line-of-sight direction from the virtual viewpoint, ii) related to the virtual viewpoint image, iii) due to an input operation on the input unit, and
wherein the provision unit provides the user with the input unit determined by the determination unit.

13. A method for controlling an information processing apparatus, the method comprising:
  acquiring information for specifying an imaging target subject imaged by a plurality of imaging apparatuses;
  determining, from among a plurality of different user interfaces used for generating virtual viewpoint images corresponding to different types of imaging target subjects based on a plurality of captured images captured by the plurality of imaging apparatuses, a user interface corresponding to a type of an imaging target subject specified based on the information acquired; and
  providing the user with the user interface determined,
  wherein, as a user interface to be provided for the user, determining an input to be provided for the user from among a plurality of inputs enabling different operations, the plurality of inputs being different in a setting for limiting a variation i) of at least one of a viewpoint position of a virtual viewpoint and a line-of-sight direction from the virtual viewpoint, ii) related to the virtual viewpoint image, iii) due to an input operation on the input, and
  wherein the user with the input unit determined is provided.

14. A method for controlling an information processing apparatus, the method comprising:
  determining, from among a plurality of different user interfaces used for generating virtual viewpoint images corresponding to different types of imaging target subjects based on a plurality of captured images captured by a plurality of imaging apparatuses, a user interface for enabling a user to specify at least one of a viewpoint position of a predetermined virtual viewpoint and a line-of-sight direction from the predetermined virtual viewpoint corresponds to a type of an imaging target subject imaged by the plurality of imaging apparatuses;
  providing the user with the user interface determined,
  wherein, as a user interface to be provided for the user, determining an input to be provided for the user from among a plurality of inputs enabling different operations, the plurality of inputs being different in a setting for limiting a variation i) of at least one of a viewpoint position of a virtual viewpoint and a line-of-sight direction from the virtual viewpoint, ii) related to the virtual viewpoint image, iii) due to an input operation on the input, and
  wherein the user with the input unit determined is provided.

15. A non-transitory computer-readable storage medium storing a program for causing a computer to execute a method, the method comprising:
  acquiring information for specifying an imaging target subject imaged by a plurality of imaging apparatuses;
  determining, from among a plurality of different user interfaces used for generating virtual viewpoint images corresponding to different types of imaging target subjects based on a plurality of captured images captured by the plurality of imaging apparatuses, a user interface corresponding to a type of an imaging target subject specified based on the information acquired; and
  providing the user with the user interface determined,
  wherein, as a user interface to be provided for the user, determining an input to be provided for the user from among a plurality of inputs enabling different operations, the plurality of inputs being different in a setting for limiting a variation i) of at least one of a viewpoint position of a virtual viewpoint and a line-of-sight direction from the virtual viewpoint, ii) related to the virtual viewpoint image, iii) due to an input operation on the input, and
  wherein the user with the input unit determined is provided.

16. A non-transitory computer-readable storage medium storing a program for causing a computer to execute a method, the method comprising:
  determining, from among a plurality of different user interfaces used for generating virtual viewpoint images corresponding to different types of imaging target subjects based on a plurality of captured images captured by a plurality of imaging apparatuses, a user interface for enabling a user to specify at least one of a viewpoint position of a predetermined virtual viewpoint and a line-of-sight direction from the predetermined virtual viewpoint corresponds to a type of an imaging target subject imaged by the plurality of imaging apparatuses;
  providing the user with the user interface determined,
  wherein, as a user interface to be provided for the user, determining an input to be provided for the user from among a plurality of inputs enabling different operations, the plurality of inputs being different in a setting for limiting a variation i) of at least one of a viewpoint position of a virtual viewpoint and a line-of-sight direction from the virtual viewpoint, ii) related to the virtual viewpoint image, iii) due to an input operation on the input, and
  wherein the user with the input unit determined is provided.

* * * * *